July 2, 1946.  F. M. SLAVIC  2,403,096
ANTIFRICTION DRIVE
Filed Dec. 20, 1943  2 Sheets-Sheet 2
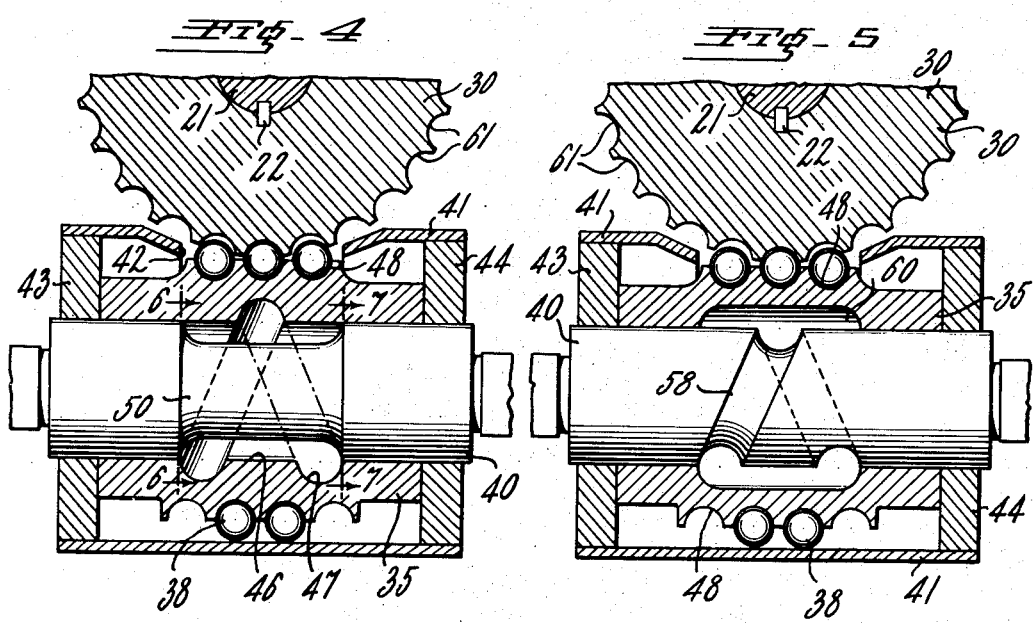
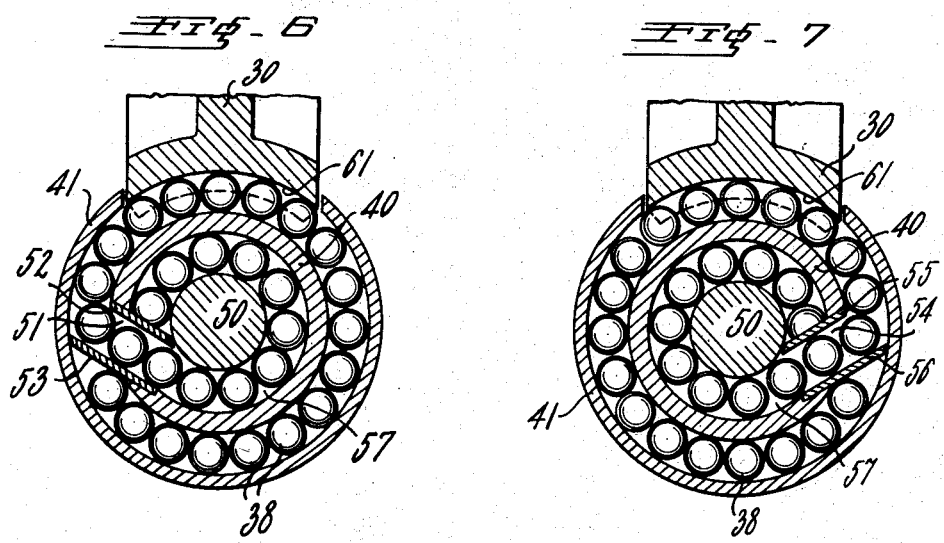
INVENTOR.
FRED M. SLAVIC
BY Richard A. Marsen
ATTORNEY Patented July 2, 1946

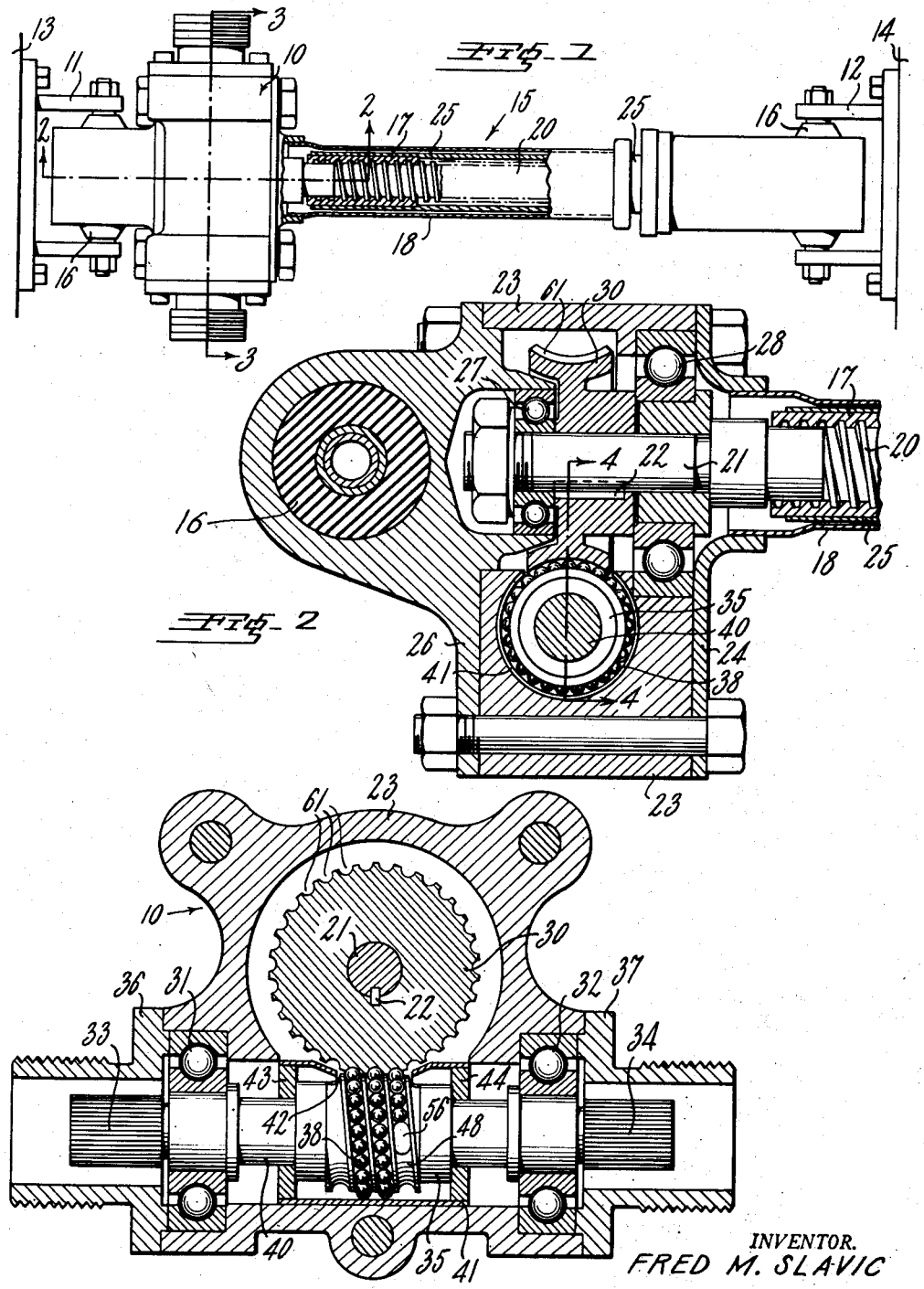

2,403,096

UNITED STATES PATENT OFFICE 2,403,096

ANTIFRICTION DRIVE

Fred M. Slavic, Los Angeles, Calif., assignor, by mesne assignments, to Lear, Incorporated, Grand Rapids, Mich., a corporation of Illinois Application December 20, 1943, Serial No. 515,065

7 Claims. (Cl. 74—458)

This invention relates to an anti-friction drive, and more particularly to a ball bearing worm and worm gear drive incorporated in a linear actuator.

In driving arrangements where a relatively high output torque is required with a relatively low input torque, worm and worm gear arrangements have been generally used. However, while the output torque of such worm drives is very high, there is a very considerable friction loss between the worm and the worm gear. Consequently, the efficiency of such drives is relatively small compared to those of other driving arrangements.

It is among the objects of this invention to provide an anti-friction worm drive; to provide an anti-friction worm drive including a worm and a worm wheel with anti-friction elements, such as ball bearings, disposed between and engaging the threads of the worm and worm gear; to provide such a drive including a novel arrangement for providing a continuous path for the anti-friction elements; to provide such a drive which is simple in construction, easily assembled, and comprises relatively few component elements; and to provide a linear actuator incorporating an anti-friction worm drive.

These and other objects, advantages and features of the invention will be apparent from the following description and the accompanying drawings. In the drawings:

Fig. 1 is a plan view, partly in section of a linear actuator embodying the anti-friction drive of the present invention.

Fig. 2 is a vertical sectional view through the anti-friction drive on the line 2—2 of Fig. 1.

Fig. 3 is a vertical sectional view through the anti-friction drive on the line 3—3 of Fig. 1.

Fig. 4 is a vertical sectional view on the line 4—4 of Fig. 2, showing details of the anti-friction drive.

Fig. 5 is a view similar to Fig. 4 illustrating a modified embodiment of the invention.

Fig. 6 is a vertical sectional view on the line 6—6 of Fig. 4, looking in the direction of the arrows.

Fig. 7 is a vertical sectional view on the line 7—7 of Fig. 4, looking in the direction of the arrows.

While the anti-friction drive of the present invention is capable of many applications, it will be more particularly described as incorporated in a linear actuator of the type described and claimed in the application of William P. Lear, Serial Number 481,980 filed April 6, 1943, and assigned to the same assignee as the present invention. As described in such application, and as illustrated in Fig. 1 of the present drawings, the linear actuator includes a gear housing 10 to which is secured a jack screw 15 comprising a rotatable screw member 20 and a substantially non-rotatable extension member or sleeve 25. Mounting means 11 and 12 are secured respectively to the housing 10 and the outer end of the jack screw 15 and connect these elements to supports diagrammatically illustrated at 13 and 14. Desirably, mounting members 11 and 12 are secured to the linear actuator through the medium of interposed resilient bushings 16, preferably rubber, as fully described in said application Serial Number 481,980.

Sleeve 25 of the jack screw is provided with an internally threaded nut 17 secured in one end thereof and having threads meshing with the threads of screw 20. A protecting or dust sleeve 18 is so arranged that it substantially encloses screw 20 in all positions of the actuator. As is shown more clearly in Fig. 2, screw 20 is provided with a reduced threaded extension 21 extending into housing 10 and through a worm wheel 30, which is secured for rotation with screw 20 by means of a key 22.

The housing 10 includes a central member 23, a front plate 24 to which the dust sleeve 18 is secured, and a rear plate 26 to which the bracket 11 is secured through the medium of bushing 16. Extension 21 of worm 20 is mounted in central portion 23 of housing 10 through the medium of anti-friction ball bearings 27 and 28.

Referring particularly to Figs. 2 and 3 of the drawings, a worm 35 is secured to a shaft 40, mounted in anti-friction bearings 31 and 32 in housing 10 and having splined ends 33 and 34. Bearings 31 and 32 are held in position by nipples 36 and 37, which are threaded to receive the coupling members of suitable flexible shaftings adapted to be connected in driving relation with splined ends 33 and 34. Worm 35 is in operative association with worm wheel 30, and a plurality of anti-friction elements, such as ball bearings 38, are disposed between the threads of the worm and the worm wheel. A retainer member 41 is stationarily mounted in housing 10 and surrounds worm 35, being provided with an aperture 42 adjacent the area of juxtaposition of worm wheel 30 and worm 35. Retainer member 41 is mounted on collars 43 and 44 rotatably engaging shaft 40.

With the described arrangement, driving thrust imparted to shaft 40 rotates worm 35. Through the medium of balls 38 which engage the threads of worm 35 and of worm wheel 30, worm 35 drives worm wheel 30 in the usual manner. This in turn rotates screw 20 which has threaded engagement with nut 17 of sleeve 25, extending or retracting jack screw 15 in accordance with the direction of rotation of the elements.

The detailed construction of the anti-friction drive will be more apparent from a consideration of Figs. 4 through 7. Referring to Fig. 4, the interior surface 46 of worm 35 is formed with a helical groove 47 extending reversely to the external thread 48 of the worm. Shaft 40 is provided with a reduced portion 50, adjacent groove 47 which, in cooperation with the groove forms an internal return path for ball bearings 38. This path extends from a point adjacent one end of the worm thread 48 to a point adjacent the other end thereof. As will be seen in Fig. 6, adjacent its left end, worm 35 is formed with an aperture 51 in which are disposed guiding elements 52 and 53, which may be secured to the worm by any suitable means such as welding or brazing. Guiding element 52 extends inwardly from the external surface of the worm into substantial engagement with reduced portion 50 of shaft 40. Guiding element 53 extends outwardly from worm 35 toward retainer sleeve 41.

Adjacent its right-hand end, worm 35 is formed with another aperture 54, adjacent which guiding elements 55 and 56 are suitably secured to the worm. Element 55 extends inwardly from the exterior surface of the worm into substantial engagement with reduced portion 50 of shaft 40, and element 56 extends outwardly toward retainer 41.

Assuming that worm 40 is rotated in such a direction that balls 38, as viewed in Figs. 6 and 7, are moving in a counter-clockwise direction, the balls will traverse thread 48 of the worm and threads 61 of worm wheel 35 until such time as they engage guiding element 53 adjacent the left end of the worm. Element 53 deflects the balls into the internal passage 57 formed by the cooperation between helical groove 47 and reduced section 50 of shaft 40. The direction of longitudinal movement of the balls is reversed inside the worm and they travel toward the right-hand end thereof. Adjacent the right-hand end, of worm 40 the balls engage element 56 and are returned to the worm thread 48 and worm wheel threads 61. In both instances, the elements 52 and 55 cooperate with the guide elements 53 and 56 in guiding the balls into their proper paths. The described arrangement thus provides a continuous path for the ball bearings within the interior of the worm drive and is a novel solution of the problem which has hitherto prevented the use of ball bearings in worm drives. Preferably, the number of balls 38 is so chosen as to substantially completely occupy the entire continuous path. Worm drive arrangements as hitherto used, such as ball bearing nut and bolt arrangements, have utilized an external return path to the balls. Obviously such arrangement is completely unadaptable to a ball bearing worm drive.

Fig. 5 illustrates a modification of the invention in which a spiral groove 58 is provided in shaft 40 and an annular channel 60 is provided in the interior surface of worm 35. Spiral 58 again extends in a direction reverse to the external threads 48 of worm 35 and in cooperation with channel 60 provides an internal return path for balls 38 from one end of thread 48 to the other end thereof. Otherwise, the construction shown in Fig. 5 is the same as that shown in Fig. 4.

The ball bearing drive of the invention provides a very substantial decrease in the friction loss between the warm 35 and the worm wheel 30. At the same time, no driving effect is lost and a greatly increased torque is available on the screw 21 as compared to the input torque on the shaft 40. The arrangement is relatively simple in construction and easily disassembled. For instance, worm 35 and shaft 40 are separately formed with the spiral groove and the channel or reduced section and then assembled. Subsequent to such assembly, guiding elements or members 52, 53, 55 and 56 are secured in place. Collars 43 and 44 are then assembled on the shaft in cooperation with retainer 41 enclosing balls 38, except at aperture 42 where the balls are retained in position by thread 48 of the worm 30 and threads 61 of worm wheel 35.

While specific embodiments of the invention have been shown and described for the purpose of illustrating the application of the principles thereof, it will be obvious that the invention may be otherwise embodied without departing from such principles.

What is claimed is:

1. An anti-friction drive comprising, in combination, a driving shaft; a worm secured to said shaft to rotate therewith; a worm wheel operatively associated with said worm; anti-friction elements disposed between and engaging the threads of said worm and worm wheel; a helical groove formed on the interior surface of said worm and extending oppositely to the thread of said worm; and apertures in said worm connecting opposite ends of said groove to opposite ends of the worm thread; said shaft having a portion of reduced diameter adjacent said groove and said groove and said reduced diameter shaft portion forming a return passage for said anti-friction elements between opposite ends of the worm thread.

2. An anti-friction drive comprising, in combination, a driving shaft; a worm secured to said shaft to rotate therewith; a worm wheel operatively associated with said worm; anti-friction elements disposed between and engaging the threads of said worm and worm wheel; a helical groove formed on the interior surface of said worm and extending oppositely to the thread of said worm; apertures in said worm connecting opposite ends of said groove to opposite ends of the worm thread; said shaft having a portion of reduced diameter adjacent said groove and said groove and said reduced diameter shaft portion forming a return passage for said anti-friction elements between opposite ends of the worm thread; and guide elements disposed in said apertures for guiding said anti-friction elements between said worm thread and return passage.

3. An anti-friction drive comprising, in combination, a driving shaft; a worm secured to said shaft to rotate therewith; a worm wheel operatively associated with said worm; anti-friction elements disposed between and engaging the threads of said worm and worm wheel; a helical groove formed on the interior surface of said worm and extending oppositely to the thread of said worm; apertures in said worm connecting opposite ends of said groove to opposite ends of the worm thread; said shaft having a portion of reduced diameter adjacent said groove and said groove and said reduced diameter shaft portion forming a return passage for said anti-friction elements between opposite ends of the worm thread; guide elements disposed in said apertures for guiding said anti-friction elements between said worm thread and return passage; and a stationary retainer member surrounding said worm.

4. An anti-friction drive comprising, in combination, a driving shaft; a worm secured to said shaft to rotate therewith; a worm wheel operatively associated with said worm; anti-friction elements disposed between and engaging the threads of said worm and worm wheel; a helical groove formed on the exterior surface of said shaft and extending oppositely to the thread of said worm; apertures in said worm connecting opposite ends of said groove to opposite ends of the worm thread; and an annular channel formed in the interior surface of said worm adjacent said groove; said groove and said annular channel forming a return passage for said anti-friction elements between opposite ends of the worm thread.

5. An anti-friction drive comprising, in combination, a driving shaft element; a worm element secured to said shaft element to rotate therewith; a worm wheel operatively associated with said worm element; ball bearings disposed between and engaging the threads of said worm element and worm wheel; a helical groove formed on the interior surface of one of said elements and extending oppositely to the thread of said worm element; the other of said elements having a recessed portion adjacent said groove, said groove and said recessed portion forming a return passage for said ball bearings between opposite ends of the worm element thread; apertures in said worm element connecting opposite ends of said groove to opposite ends of the worm element thread; guide elements disposed in said apertures for guiding said ball bearings between said worm element thread and return passage; and a stationary retainer member surrounding said worm element.

6. An anti-friction drive comprising, in combination, a driving shaft; a worm secured to said shaft to rotate therewith; a worm wheel operatively associated with said worm; anti-friction elements disposed between and engaging the threads of said worm and worm wheel; a helical groove formed on the exterior surface of said shaft and extending oppositely to the thread of said worm; apertures in said worm connecting opposite ends of said groove to opposite ends of the worm thread; an annular channel formed in the interior surface of said worm adjacent said groove; said groove and said annular channel forming a return passage for said anti-friction elements between opposite ends of the worm thread; and guide elements disposed in said apertures for guiding said anti-friction elements between said worm thread and return passage.

7. An anti-friction drive comprising, in combination, a driving shaft; a worm secured to said shaft to rotate therewith; a worm wheel operatively associated with said worm; anti-friction elements disposed between and engaging the threads of said worm and worm wheel; a helical groove formed on the exterior surface of said shaft and extending oppositely to the thread of said worm; apertures in said worm connecting opposite ends of said groove to opposite ends of the worm thread; an annular channel formed in the interior surface of said worm adjacent said groove; said groove and said annular channel forming a return passage for said anti-friction elements between opposite ends of the worm thread; guide elements disposed in said apertures for guiding said anti-friction elements between said worm thread and return passage; and a stationary retainer member surrounding said worm.

FRED M. SLAVIC.